United States Patent
Tanogashira et al.

(10) Patent No.: US 10,136,776 B2
(45) Date of Patent: Nov. 27, 2018

(54) TOILET APPARATUS

(71) Applicant: TOTO LTD., Kitakyushu-shi, Fukuoka (JP)

(72) Inventors: Yuta Tanogashira, Kitakyushu (JP); Shoichi Tsuiki, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/682,628

(22) Filed: Aug. 22, 2017

(65) Prior Publication Data

US 2018/0055297 A1    Mar. 1, 2018

(30) Foreign Application Priority Data

Aug. 23, 2016   (JP) .................. 2016-162440

(51) Int. Cl.
| | |
|---|---|
| *E03D 1/00* | (2006.01) |
| *A47K 13/30* | (2006.01) |
| *E03D 5/10* | (2006.01) |
| *E03D 9/00* | (2006.01) |
| *G01S 13/04* | (2006.01) |
| *G01S 13/56* | (2006.01) |
| *G01S 7/35* | (2006.01) |

(52) U.S. Cl.
CPC ............... *A47K 13/30* (2013.01); *E03D 5/10* (2013.01); *E03D 9/007* (2013.01); *G01S 13/04* (2013.01); *G01S 13/56* (2013.01); *G01S 7/352* (2013.01)

(58) Field of Classification Search
CPC ............ A47K 13/30; E03D 5/10; E03D 9/007
USPC ............................................................. 4/313
See application file for complete search history.

(56) References Cited

U.S. PATENT DOCUMENTS

| | | | | |
|---|---|---|---|---|
| 6,067,673 A | * | 5/2000 | Paese ................. | E03C 1/057 4/313 |
| 8,082,607 B2 | * | 12/2011 | Matsushita .......... | A47K 13/24 4/302 |
| 2003/0019023 A1 | * | 1/2003 | Furukawa ............ | A47K 13/10 4/420.4 |
| 2015/0267387 A1 | * | 9/2015 | Shinohara ........... | E03D 1/34 4/313 |
| 2017/0016221 A1 | | 1/2017 | Yamamoto | |

* cited by examiner

*Primary Examiner* — Huyen Le
(74) *Attorney, Agent, or Firm* — Pearne & Gordon LLP (57) ABSTRACT

A toilet apparatus according to an embodiment includes a human body detector and a controlled part. The toilet apparatus is mounted to a toilet. The human body detector radiates a radio wave and detects a human body based on the signal that is obtained. The human body detector outputs a control signal based on the detection result. The controlled part is controlled based on the control signal. The human body detector has two or more establishment times from when the signal is obtained until when the detection result based on the signal is established.

3 Claims, 6 Drawing Sheets

REAR ←—→ FRONT

TOILET APPARATUS

CROSS-REFERENCE TO RELATED APPLICATIONS

This application is based upon and claims the benefit of priority from Japanese Patent Application No. 2016-162440, filed on Aug. 23, 2016; the entire contents of which are incorporated herein by reference.

FIELD

Embodiments described herein relate generally to a toilet apparatus.

BACKGROUND

There is a toilet apparatus including a radio wave sensor for detecting a detection object in a toilet space. In Japanese Patent No. 4482301, the following technology is discussed in which a radio wave sensor provided in the toilet apparatus is used. In this technology, technology that detects the movement of the detection object from phase difference information of a signal is combined with technology that detects the presence or absence of the detection object from the signal strength. Specifically, in the case where the entrance or exit of the toilet room is in front of the toilet apparatus, the presence or absence and movement of the human body are determined based on the phase difference information. In the case where the entrance or exit is at the side surface of the toilet apparatus, the presence or absence of the human body is determined based on the signal strength.

For example, in the case where a user of the toilet apparatus performs standing urination, the user is substantially stationary in a standing posture. Thus, according to the state of use of the user inside the toilet room, there are cases where a large signal strength is not obtained. Accordingly, when detecting the presence or absence of the human body based on the signal strength, it is desirable to increase the sensitivity of the radio wave sensor.

However, when the sensitivity is increased, the radio wave sensor undesirably detects, at the periphery of the toilet room, a human not intending to use the toilet room. As a result, there is a possibility that the state of detecting the human body to be present is continued even though the user has exited the toilet room.

For example, from the state of the human body being present, if the toilet apparatus is supposed to wash the toilet or close the toilet lid when the radio wave sensor detects that the human body is absent, these operations are not performed if the detection of the human body being present undesirably continues.

The invention is based on the recognition of such problems and is directed to provide a toilet apparatus in which a human body intending to use the toilet apparatus can be detected with higher precision.

SUMMARY

A toilet apparatus according to an embodiment includes a human body detector and a controlled part. The toilet apparatus is mounted to a toilet. The human body detector radiates a radio wave and detects a human body based on the signal that is obtained. The human body detector outputs a control signal based on the detection result. The controlled part is controlled based on the control signal. The human body detector has two or more establishment times from when the signal is obtained until when the detection result based on the signal is established.

DETAILED DESCRIPTION

A toilet apparatus of a first invention includes a human body detector and a controlled part. The toilet apparatus is mounted to a toilet. The human body detector radiates a radio wave and detects a human body based on the signal that is obtained. The human body detector outputs a control signal based on the detection result. The controlled part is controlled based on the control signal. The human body detector has two or more establishment times from when the signal is obtained until when the detection result based on the signal is established.

According to the toilet apparatus, it is possible to shorten the average time to detect the human body intending to use the toilet apparatus while detecting the human body with high precision.

In a toilet apparatus of a second invention, the human body detector of the first invention has two or more establishment times from a state in which the human body is detected as being present until when the human body is detected as being absent.

According to the toilet apparatus, the continuation of the detection result of the human body being present even though no human body is present inside a toilet room where the toilet apparatus is provided can be suppressed. According to the toilet apparatus, the detecting of the human body being absent even though the toilet apparatus is in use can be suppressed.

A toilet apparatus of a third invention further includes a main part pivotally supporting a toilet seat to be rotatable in the first or second invention. The main part is provided on a toilet. The human body detector controls the controlled part based on the detection result when the toilet seat is in an open state.

According to the toilet apparatus, the controlled part can be controlled more appropriately according to the presence or absence of the user. Thereby, the likelihood of operations being performed during standing urination such as washing or the toilet seat undesirably closing can be reduced.

In a toilet apparatus of a fourth invention, the human body detector includes multiple sensitivities in any one of the first to third inventions. The multiple sensitivities respectively correspond to two or more of the establishment times. The human body detector performs the detecting of the human body using one of the multiple establishment times and using one of the multiple sensitivities corresponding to the one of the multiple establishment times.

According to the toilet apparatus, it is possible to detect the human body intending to use the toilet apparatus with higher precision.

Embodiments of the invention will now be described with reference to the drawings. Similar components in the drawings are marked with the same reference numerals; and a detailed description is omitted as appropriate.

Figure 1:
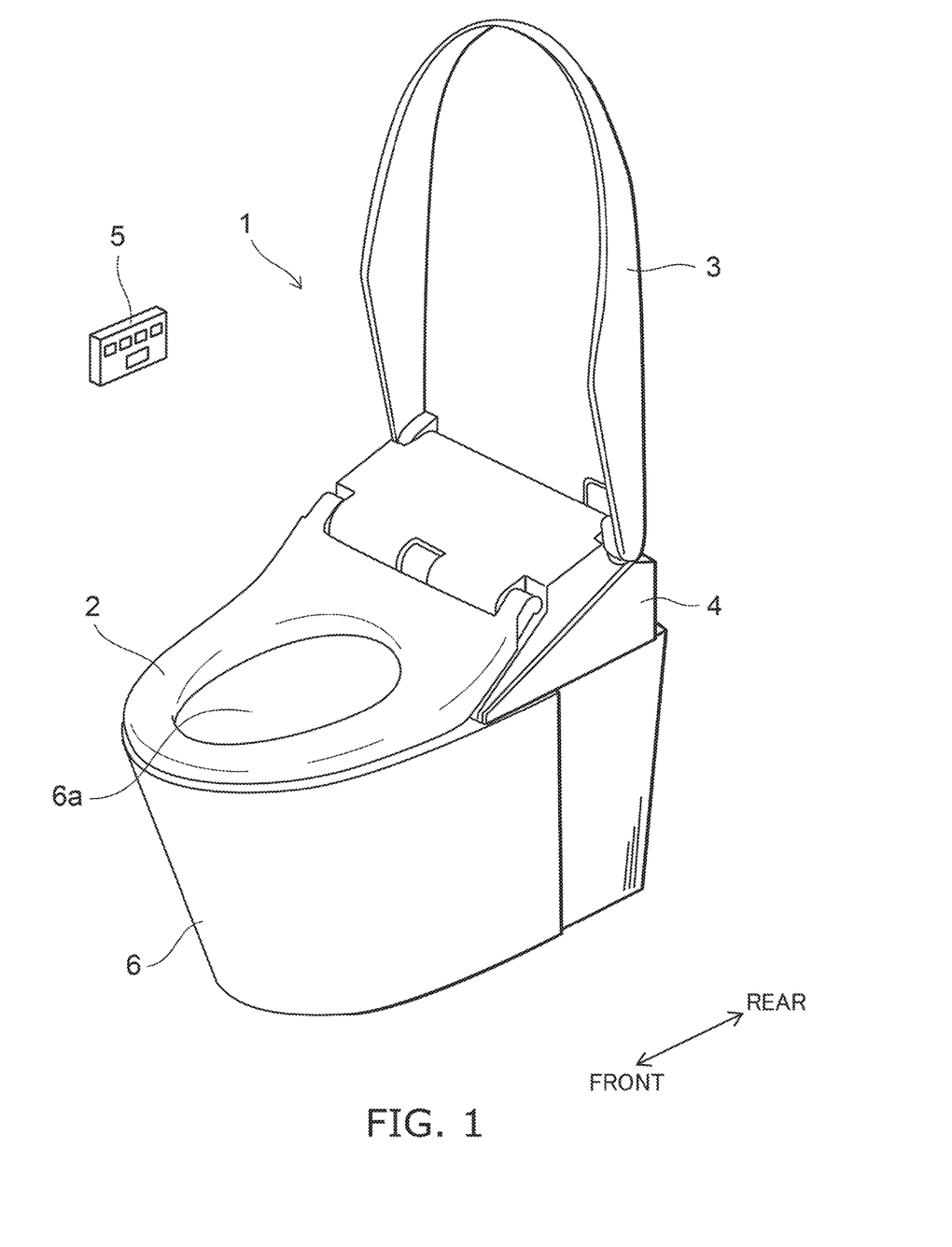
FIG. 1 is a perspective view illustrating a toilet in which a toilet apparatus according to an embodiment is provided.

FIG. 1 is a perspective view illustrating a toilet in which a toilet apparatus according to the embodiment is provided.

Figure 2:
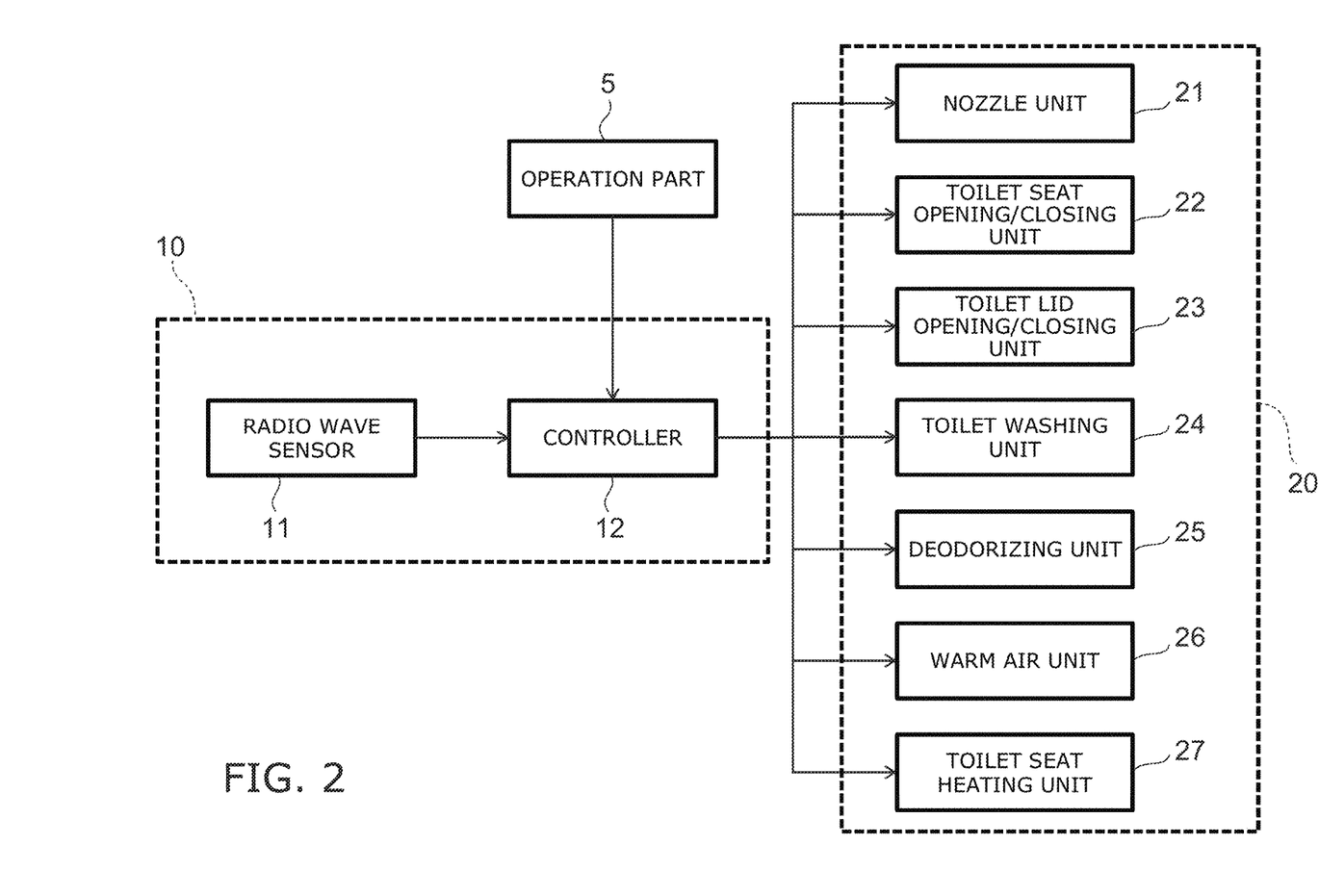
FIG. 2 is a block diagram illustrating relevant components of the toilet apparatus according to the embodiment.

FIG. 2 is a block diagram illustrating relevant components of the toilet apparatus according to the embodiment.

As illustrated in FIG. 1, the toilet apparatus 1 according to the embodiment is mounted to a western-style sit-down toilet (for convenience of description hereinbelow, called simply the "toilet") 6. The toilet apparatus 1 includes a toilet seat 2, a toilet lid 3, and a main part 4. The main part 4 is placed on the toilet 6; and the toilet seat 2 and the toilet lid 3 each are pivotally supported openably and closeably by the main part 4.

Although frontward/rearward directions are used in the description of the embodiments hereinbelow, these directions are as viewed by a user seated on the toilet seat 2.

As illustrated in FIG. 2, the toilet apparatus 1 further includes a controlled part 20 and a human body detector 10 provided in the interior of the main part 4. The human body detector 10 includes a radio wave sensor 11 and a controller 12.

The radio wave sensor 11 radiates a high frequency radio wave such as a microwave, a millimeter wave, etc., frontward of the toilet apparatus 1 and receives a reflected wave from the detection object (the human body) of the radiated radio wave. Information that relates to the state of the detection object is included in the reflected wave. The radio wave sensor 11 obtains a detection signal based on the radiated radio wave and the reflected wave. Then, the radio wave sensor 11 detects the presence or absence of the human body based on the detection signal and outputs the detection result to the controller 12. The controller 12 is, for example, a circuit such as a microcomputer, etc. The controller 12 outputs a control signal to the controlled part 20 based on the detection result output from the radio wave sensor 11.

A part of the processing performed by the radio wave sensor 11 may be performed by the controller 12. For example, the detection signal that is obtained by the radio wave sensor 11 is output to the controller 12. The detection result of the presence or absence of the human body is established by the controller 12 based on the detection signal. The control signal is output to the controlled part 20 from the controller 12.

In other words, the human body detector 10 radiates the radio wave, obtains the detection signal, and detects the presence or absence of the human body based on the detection signal. The human body detector 10 outputs the control signal to the controlled part 20 based on the detection result. As long as these operations are realized, the specific configuration of the human body detector 10 may be modified appropriately.

The controlled part 20 includes, for example, a nozzle unit 21, a toilet seat opening/closing unit 22, a toilet lid opening/closing unit 23, a toilet washing unit 24, a deodorizing unit 25, a warm air unit 26, and a toilet seat heating unit 27.

The nozzle unit 21 includes a washing nozzle and a drive unit. The washing nozzle is contained in the interior of the main part 4. The drive unit drives the washing nozzle. The drive unit causes the washing nozzle to advance into a bowl 6a of the toilet 6 and retract from the bowl 6a. For example, when the nozzle unit 21 receives a control signal from the controller 12, the drive unit causes the washing nozzle to advance into the bowl 6a. Washing water is discharged from the washing nozzle toward a private part of the user.

The toilet seat opening/closing unit 22 opens (raises) and closes (lowers) the toilet seat 2 based on a control signal from the controller 12. The toilet lid opening/closing unit 23 opens (raises) and closes (lowers) the toilet lid 3 based on a control signal from the controller 12. The toilet washing unit 24 washes the interior of the bowl 6a of the toilet 6 based on a control signal from the controller 12. The deodorizing unit 25 forces the air of the toilet room through a filter, a catalyst, etc., based on a control signal from the controller 12. Thereby, offensive-odor components are reduced. The warm air unit 26 blows warm air based on a control signal from the controller 12. The "bottom" or the like of the user seated on the toilet seat 2 is dried by the warm air by the warm air being blown toward the "bottom" or the like. The toilet seat heating unit 27 warms the seating surface of the toilet seat 2 by heating the seating surface based on a control signal from the controller 12.

The components described above that are included in the controlled part 20 are examples. The controlled part 20 may include only some of the components described above. Or, the controlled part 20 may include another component that operates based on a control signal.

It is also possible for the controller 12 to operate at least some of the components of the controlled part 20. This operation is based on a signal input from an operation part 5 such as a remote control or the like, the signal of a seat contact detection sensor provided in the toilet seat 2, etc. In the example described above, the controller that outputs the control signal to the controlled part 20 based on the detection result of the radio wave sensor 11 is the same as the controller that outputs the control signal to the controlled part 20 based on the input of the operation part 5, etc. These controllers may be provided separately.

The relationship between the state when the toilet apparatus is used and the detection signal obtained by the radio wave sensor 11 at such a time will now be described with reference to FIGS. 3A to 3C and FIG. 4.

Figure 3A:
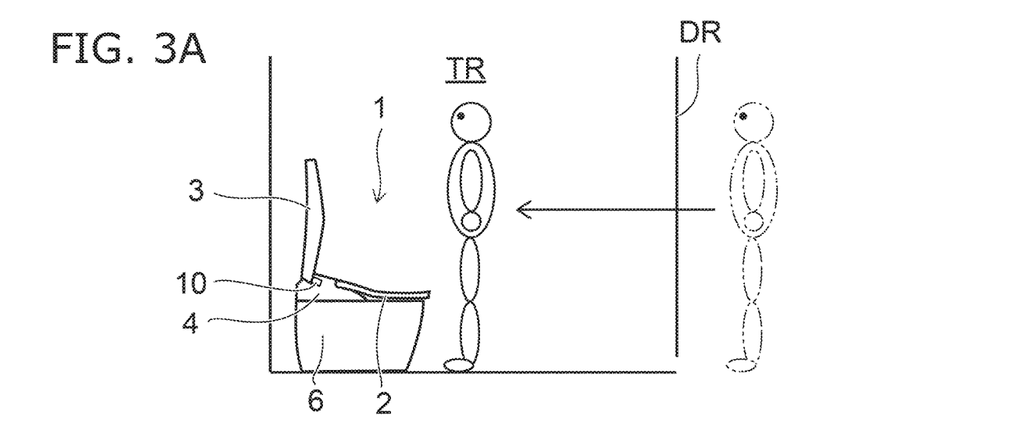
FIGS. 3A to 3C are side views illustrating the state when the toilet apparatus according to the embodiment is used.
Figure 3B:
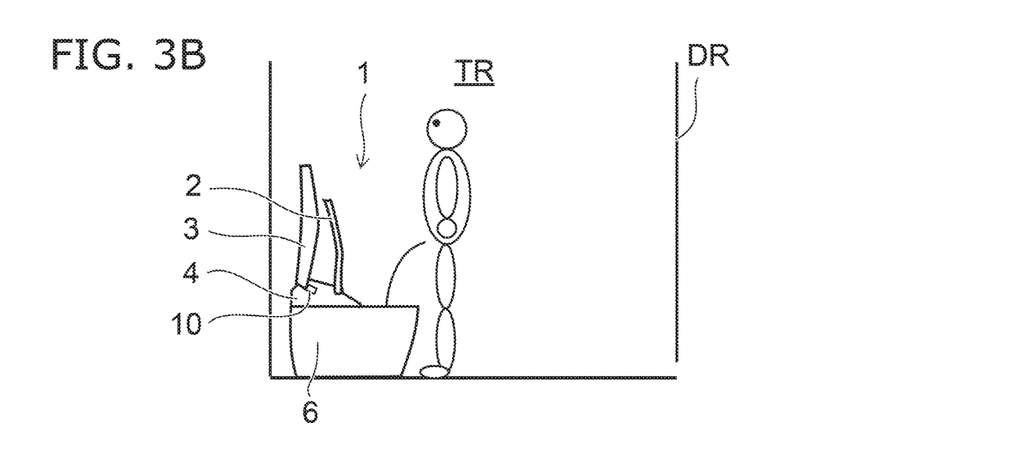
Figure 3C:
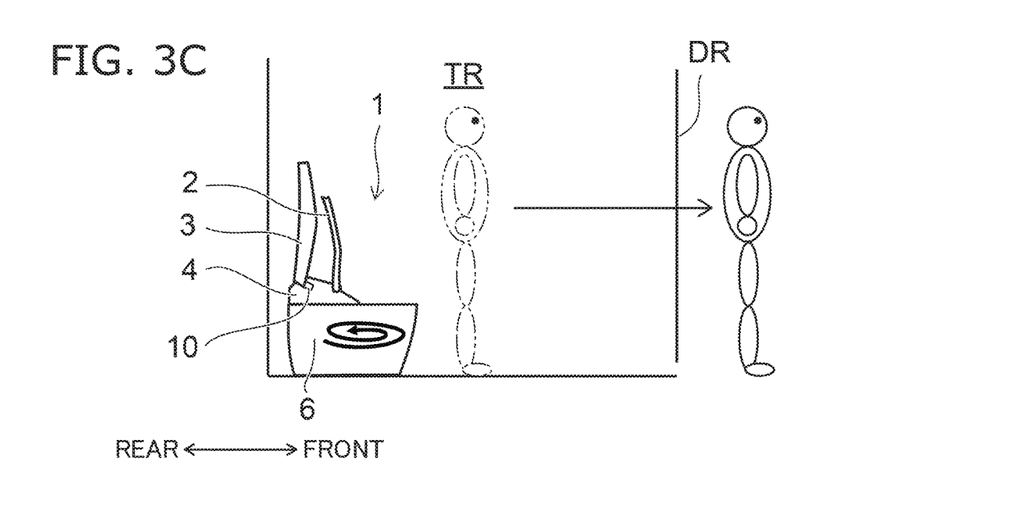

FIGS. 3A to 3C are side views illustrating the state when the toilet apparatus according to the embodiment is used.

Figure 4:
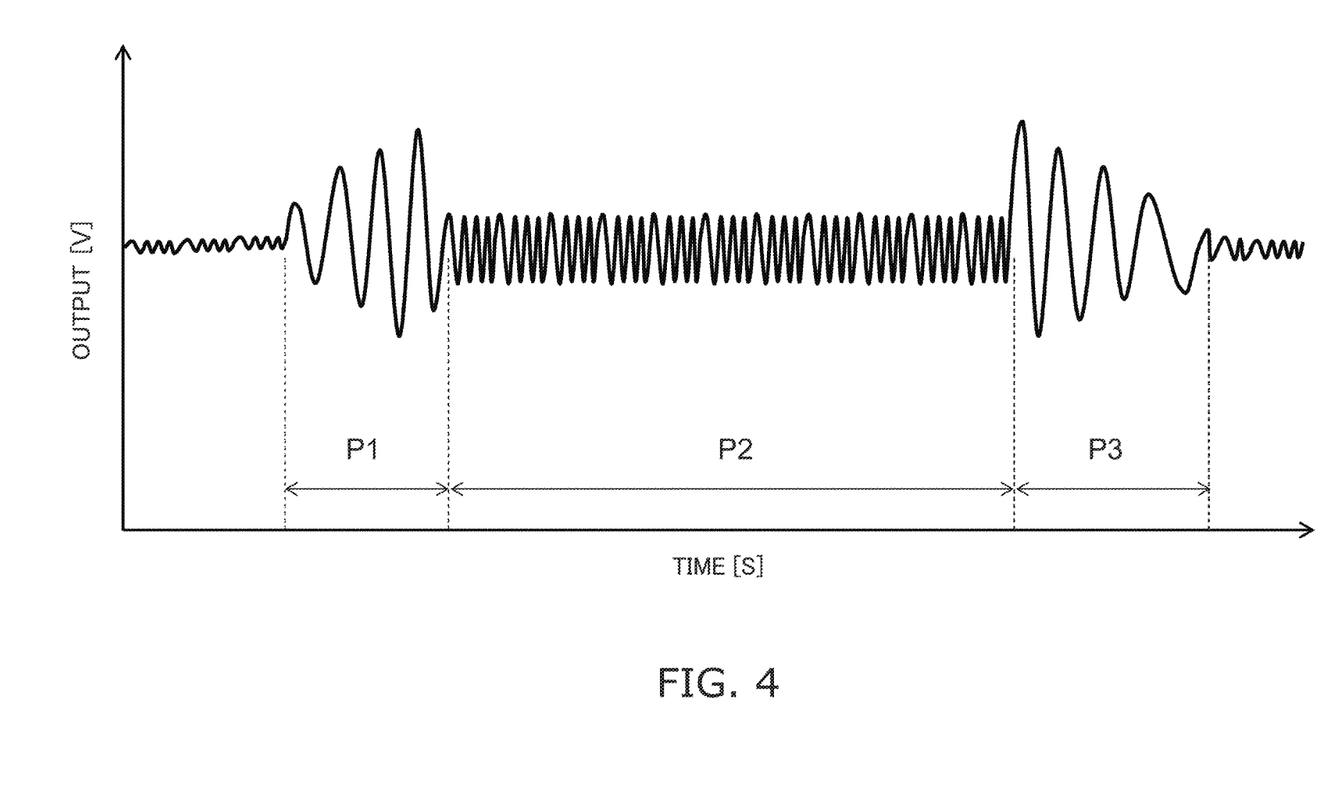
FIG. 4 is a figure illustrating the detection signal obtained by the radio wave sensor in the states of use of FIGS. 3A to 3C.

FIG. 4 is a figure illustrating the detection signal obtained by the radio wave sensor in the states of use of FIGS. 3A to 3C.

In FIG. 4, the horizontal axis is the time (S (seconds)); and the vertical axis is the output of the signal (V (volts)).

Information that relates to the doppler effect is included in the detection signal obtained by the radio wave sensor 11. Namely, when the transmission wave that is radiated from the radio wave sensor 11 is reflected by a moving detection object (human body), the wavelength of the reflected wave shifts due to the doppler effect. When the human body moves relative to the radio wave sensor 11, a signal that includes a component of a frequency $\Delta F$ proportional to the speed of the human body is obtained. Accordingly, the speed of the human body can be determined by measuring the doppler frequency $\Delta F$. The magnitude (the amplitude) of the obtained detection signal increases as the distance between the human body and the radio wave sensor 11 decreases.

First, as illustrated in FIG. 3A, the user enters a toilet room TR through a door DR. Because the user has a large movement in the direction toward the radio wave sensor 11, the detection signal has a large oscillation in which the amplitude increases with the movement as illustrated in an interval P1 of FIG. 4. At this time, for example, it is detected by the human body detector 10 that the human body is inside the toilet room TR; and the toilet lid 3 is opened due to the reception of the control signal of the controller 12.

Then, as illustrated in FIG. 3B, for example, the user opens the toilet seat 2 and performs standing urination. While performing standing urination, the user substantially does not move. Therefore, the detection signal that is obtained is small as illustrated in an interval P2 of FIG. 4. However, a small detection signal due to micro movement is obtained because the body of the user moves slightly.

Subsequently, as illustrated in FIG. 3C, the user exits the toilet room TR through the door DR. The user has a large movement in the direction away from the radio wave sensor 11. A detection signal that has a large amplitude is obtained as illustrated in an interval P3 of FIG. 4. The amplitude decreases as the user moves toward the direction away from the radio wave sensor 11. At this time, it is detected by the human body detector 10 that the human body is not inside the toilet room TR due to the decrease of the signal strength. Then, the controller 12 drives the toilet washing unit 24 to wash the toilet 6 and/or drives the toilet seat opening/closing unit 22 and/or the toilet lid opening/closing unit 23 to close the toilet seat 2 and/or the toilet lid 3. In the detecting of the presence or absence of the human body by the human body detector 10, for example, it is detected that the human body is not inside the toilet room TR when a signal that exceeds a prescribed threshold is no longer obtained within a prescribed amount of time.

Thus, when the human body detector 10 detects the presence or absence of the human body, the controlled part 20 is operated by receiving the detection result. In other words, it is difficult to operate the controlled part 20 according to the behavior of the user if the presence or absence of the human body is not detected correctly by the human body detector 10.

As illustrated in FIG. 4, the detection signal is small in the interval P2 when the user is performing standing urination. Accordingly, if the human body detector 10 cannot discriminate the interval P2 from the state in which the user is no longer present after the interval P3, the washing of the toilet 6 may be performed or the toilet seat 2 and the toilet lid 3 may be closed during the standing urination.

To prevent detecting that no human body is present even though the human body is present, it may be considered to set a long establishment time until detecting that no human body is present. The user is not completely stationary when performing standing urination. Therefore, large movements of the user that occasionally occur can be detected by setting the establishment time to be long. However, in the case where the establishment time is set to be long, even after the user has exited the toilet room TR, it will not be detected during the long establishment time that no human body is present. In other words, the timing at which the control signal from the controller 12 is output also is delayed because the detection result that no human body is present is not output until the establishment time has elapsed. Therefore, the washing operation of the toilet 6, the operation of closing the toilet seat 2 and the toilet lid 3, etc., which are performed by receiving the control signal are undesirably delayed.

It also may be considered to increase the sensitivity of the radio wave sensor 11. By increasing the sensitivity of the radio wave sensor 11, the human body can be detected for even a relatively small movement. In such a case, it is also possible to set the establishment time to be short because the user performing standing urination is detected easily. However, if the sensitivity of the radio wave sensor 11 is increased, there are cases where a human body outside the toilet room TR or the like is detected even after the user has finished using the toilet apparatus 1 and has exited the toilet room TR. In such a case, it is detected that the human body is present even though no human body is present inside the toilet room TR.

The sensitivity can be changed by the following methods. The threshold for the detection signal is modified when detecting the presence or absence of the human body. Or, the intensity of the radio wave radiated from the radio wave sensor 11 is modified. For example, if the threshold for detecting the human body is reduced, it is detected that the human body is in the toilet room TR even for a relatively small signal. Therefore, the sensitivity of the radio wave sensor 11 improves.

In the embodiment, the human body detector 10 performs the determination illustrated in the flowchart of FIG. 5 recited below. As a result, the time until detecting that the human body is not inside the toilet room TR is shortened while suppressing the detection of a human body of outside the toilet room TR.

Figure 5:
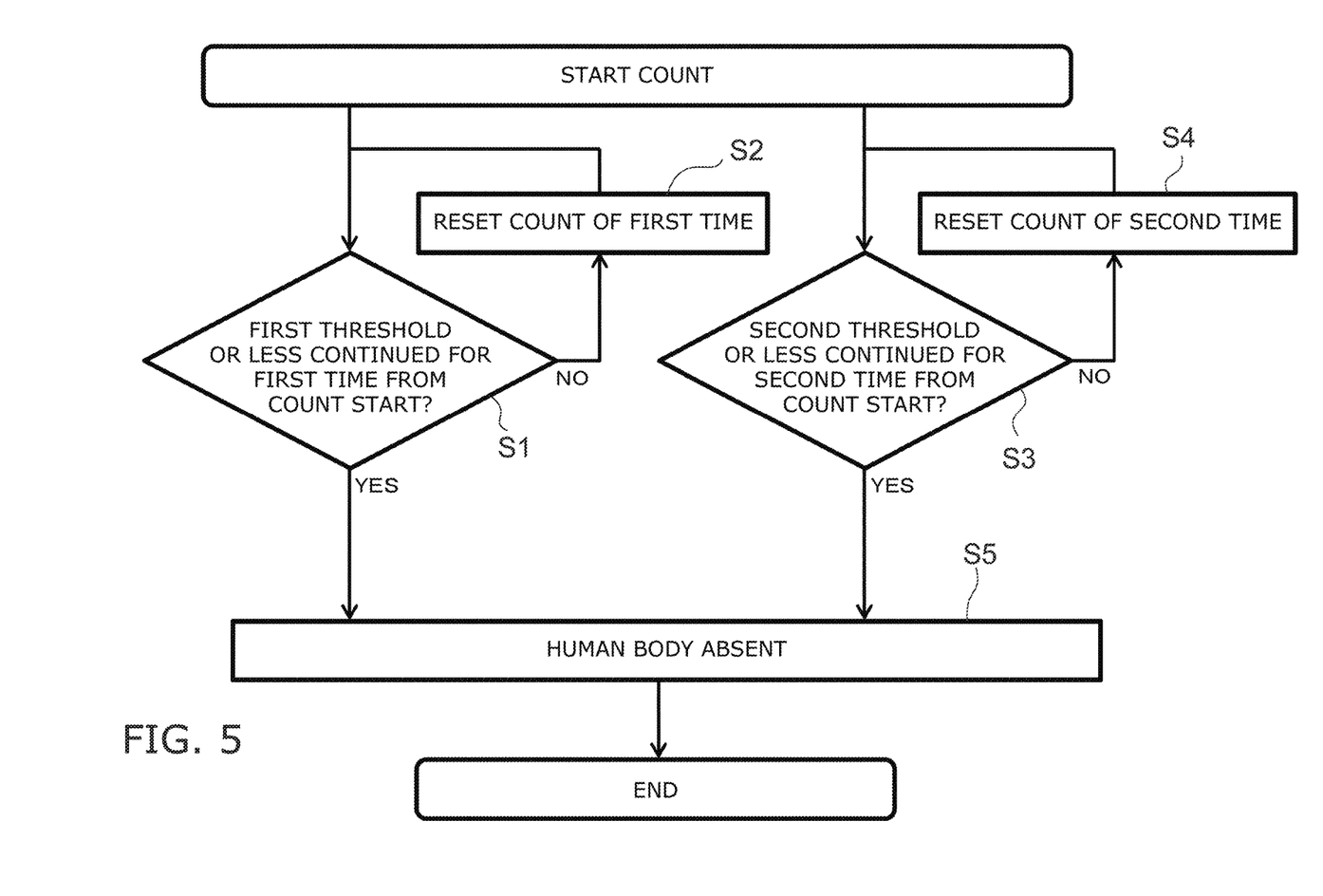
FIG. 5 is a flowchart illustrating the operation of the human body detector included in the toilet apparatus according to the embodiment.

FIG. 5 is a flowchart illustrating the operation of the human body detector included in the toilet apparatus according to the embodiment.

When the count of the time is started, it is determined whether or not a signal that is the first threshold or more is detected within the first time in step S1. In the case where the detection signal that is the first threshold or more is obtained within the first time, the flow proceeds to step S2. The count of the first time is reset; and step S1 is started again.

In step S3 which is executed in parallel to step S1, it is determined whether or not a signal that is the second threshold or less is detected within the second time from the count start. The second threshold is greater than the first threshold. The second time is longer than the first time. In the case where the detection signal that is the second threshold or more is obtained within the second time, the flow proceeds to step S4. At this time, the count of the second time is reset; and step S3 is started again.

It is determined that no human body is present inside the toilet room TR in step S5 in the case where the detection signal exceeding the first threshold is not obtained within the first time, or in the case where the detection signal exceeding the second threshold is not obtained within the second time.

In other words, the detection result of the human body being absent is established if a first condition or a second condition is satisfied from the state in which the human body is detected as being present. The first condition is that the first time elapsing without the detection signal exceeding the first threshold being detected. The second condition is that the second time elapsing without the detection signal exceeding the second threshold being detected.

For example, the first time is set to 5 seconds. Then, the first threshold is set to a value sufficient to detect the user when performing standing urination in 5 seconds. In other words, the first threshold is set to a value such that a detection signal exceeding the first threshold is expected to be obtained within 5 seconds from the user performing standing urination.

For example, the second time is set to 10 seconds. Then, the second threshold is set to a value sufficient to detect the user when performing standing urination in 10 seconds. In other words, the second threshold is set to a value such that a detection signal exceeding the second threshold is expected to be obtained within 10 seconds from the user performing standing urination.

One of the radio wave sensor 11 or the controller 12 may store all of the information of the first threshold, the second threshold, the first time, and the second time. Or, the information may be stored separately in the radio wave sensor 11 and the controller 12.

For example, the radio wave sensor 11 stores the information of the thresholds and the times. In such a case, the detection result is established from the detection signal using the information; and the detection result is output to the controller 12.

Or, the radio wave sensor 11 may store the information of the first threshold and the second threshold; and the controller 12 may store the information of the first time and the second time. In such a case, for example, it is output to the controller 12 that a signal from the radio wave sensor 11 that is not more than the first threshold is detected. Subsequently, if it is not input from the radio wave sensor 11 that a signal exceeding the first threshold is detected within the first time, the controller 12 outputs the control signal to the controlled part 20.

Effects of the embodiment will now be described in detail with reference to FIGS. 6A and 6B.

Figure 6A:
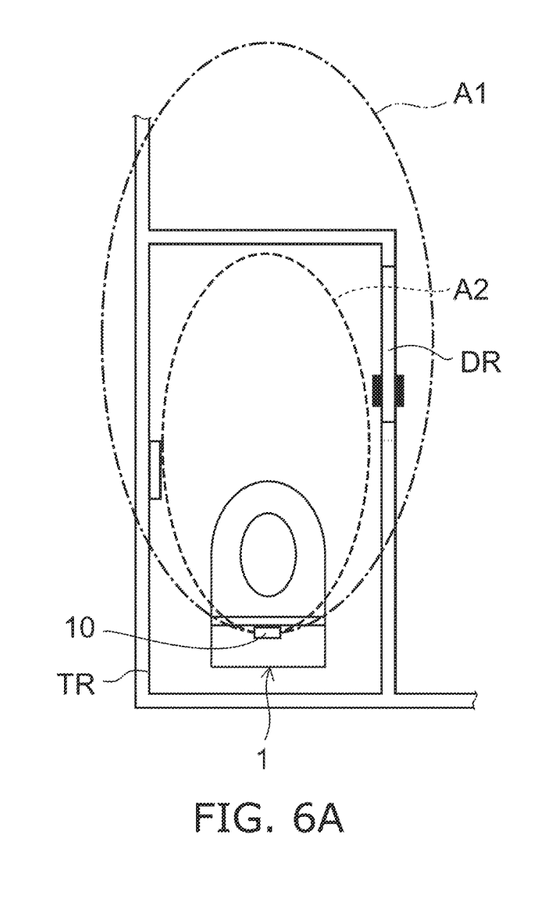
FIGS. 6A and 6B are plan views illustrating the toilet room where the toilet apparatus is provided according to the embodiment.
Figure 6B:
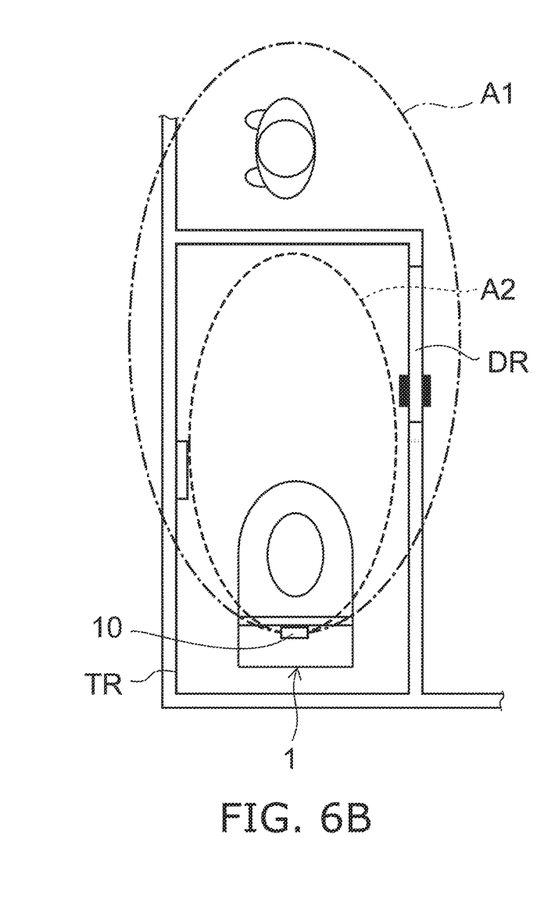

FIGS. 6A and 6B are plan views illustrating the toilet room where the toilet apparatus is provided according to the embodiment.

The detection area of the human body detector 10 is changed by modifying the threshold. In the case where the threshold is low as illustrated in FIGS. 6A and 6B, a human body is detected even for a small detection signal. Therefore, the presence or absence of the human body is detected in a wide area A1. In the case where the threshold is high, the human body is not detected if the detection signal is not large. Therefore, the presence or absence of the human body is detected in a narrow area A2.

According to the detection method illustrated in the flowchart of FIG. 5, in the case where no human body is present in the wider detection area A1 as illustrated in FIG. 6A and the detection signal is not obtained within the first time, the detection result of the human body being absent is established after the first time has elapsed. In the case where there is a human body inside the detection area A1 outside the toilet room TR as illustrated in FIG. 6B, the detection result of the human body being absent is not established in the first time. However, even in such a case, because the detection signal is not obtained in the detection area A2 within the second time, the detection result of the human body being absent is established after the second time has elapsed.

In other words, if there is no human inside or around the toilet room TR, the detection result of the human body being absent is established in the first time. If there is a human around the toilet room TR but there is no human inside the toilet room TR, the detection result of the human body being absent is established in the second time.

In the example described above, the human body detector 10 has two establishment times until when the detection result of the presence or absence of the human body is established. The human body detector 10 may have three or more establishment times and three or more mutually-different sensitivities. The three or more sensitivities correspond respectively to the three or more establishment times.

Thus, the human body detector 10 has multiple establishment times until when the detection result of the presence or absence of the human body is established. Also, different sensitivities are set respectively for the establishment times.

According to such a configuration, it is possible to shorten the average time to detect the human body around the toilet apparatus 1 intending to use the toilet apparatus 1 while detecting the human body with high precision.

In particular, the human body detector 10 has multiple establishment times from the state in which the human body is detected as being present until when the human body is detected as being absent. Thereby, the continuing detection result of the human body being present even though no human body is present inside the toilet room TR can be suppressed. The detecting of the human body being absent even though the toilet apparatus 1 is being used can be suppressed.

The misdetection that no human body is present even though the toilet apparatus 1 is being used occurs easily when the user is performing standing urination in the open state in which the toilet seat 2 is open. Should it be detected that no human body is present during the standing urination, the toilet 6 may be washed or the toilet seat 2 may be closed despite being in use. If the washing of the toilet 6 is performed during the standing urination, the washing of the toilet 6 will be performed again after use. Therefore, the toilet 6 is washed twice; and water is undesirably wasted. If the toilet seat 2 is closed during the standing urination, the urine splashes off the toilet seat 2 and soils the user and the periphery of the toilet apparatus 1.

The embodiment is particularly effective in the following case. The human body detector 10 has two or more establishment times of the detection result from the state in which the human body is detected as being present until when the human body is detected as being absent. The toilet seat 2 is operated by the controller 12 receiving the detection result.

The toilet seat 2 can be controlled more appropriately according to the presence or absence of the user. The likelihood of the undesirable operations of the toilet 6 being washed or the toilet seat 2 being closed during the standing urination can be reduced.

Examples of the operations of the toilet apparatus 1 according to embodiments are described above.

The user opens the toilet lid 3 and the toilet seat 2 of the toilet apparatus 1 according to the embodiments. In the case where there is no other human around the toilet apparatus 1, the toilet 6 is washed or the toilet seat 2 and/or the toilet lid 3 are closed when the user has moved a sufficient distance from the front of the toilet apparatus 1 and the relatively short first time has elapsed. In the case where there is another human at a position relatively proximal to the toilet apparatus 1, the toilet 6 is washed or the toilet seat 2 and/or the toilet lid 3 are closed when the user has moved a sufficient distance from the front of the toilet apparatus 1 and the relatively long second time has elapsed.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, layout, and placement of each element such as the toilet apparatus 1 are not limited to those illustrated, but can be suitably modified.

Furthermore, the elements of the above embodiments can be combined with each other as long as technically feasible. Such combinations are also encompassed within the scope of the invention as long as they include the features of the invention.

What is claimed is:

1. A toilet apparatus mounted to a toilet, the apparatus comprising:
   a human body detector capable of radiating a radio wave, the human body detector detecting a human body based on an obtained signal, the human body detector outputting a control signal based on a result of the detecting; and
   a controlled part, the controlled part being controlled based on the control signal,
   the human body detector having two or more establishment times from when the signal is obtained until when the detection result based on the signal is established,
   the human body detector having a plurality of sensitivities,
   the plurality of sensitivities corresponding respectively to two or more of the establishment times, and
   the human body detector performing the detecting of the human body by using one of the plurality of establishment times and using one of the plurality of sensitivities corresponding to the one of the plurality of establishment times.

2. The apparatus according to claim 1, wherein the human body detector has two or more establishment times from a state in which the human body is detected as being present until when the human body is detected as being absent.

3. The apparatus according to claim 1, further comprising a main part provided on the toilet, a toilet seat being pivotally supported by the main part to be rotatable,
   the human body detector controlling the controlled part based on the detection result when the toilet seat is in an open state.

* * * * *